United States Patent
Panz et al.

(10) Patent No.: US 6,899,951 B2
(45) Date of Patent: May 31, 2005

(54) HIGH-WHITENESS, NON-HEAT-TREATED HYDROPHOBIC PRECIPITATED SILICA

(75) Inventors: Christian Panz, Wesseling (DE); Ralf Schmoll, Bonn (DE); Michael Kempf, Rodenbach (DE); Mario Scholz, Gründau (DE)

(73) Assignee: Degussa AG, Duesseldorf (DE)

( * ) Notice: Subject to any disclaimer, the term of this patent is extended or adjusted under 35 U.S.C. 154(b) by 197 days.

(21) Appl. No.: 10/211,277

(22) Filed: Aug. 5, 2002

(65) Prior Publication Data

US 2003/0162881 A1 Aug. 28, 2003

(30) Foreign Application Priority Data

Aug. 4, 2001 (DE) .......................................... 101 38 492

(51) Int. Cl.⁷ ................................................ C08K 3/36
(52) U.S. Cl. ..................... 428/405; 427/220; 523/212; 516/117; 516/120; 106/490; 423/335; 423/338; 524/492; 524/493
(58) Field of Search .......................... 428/405; 423/335, 423/338; 106/490; 516/117, 120; 523/212; 427/220; 524/492, 493

(56) References Cited

U.S. PATENT DOCUMENTS

| | | | |
|---|---|---|---|
| 3,334,062 A | | 8/1967 | Brown et al. |
| 3,830,738 A | | 8/1974 | Cottrell |
| 4,273,589 A | | 6/1981 | Nauroth et al. |
| 4,344,858 A | | 8/1982 | Zucker et al. |
| 4,377,493 A | | 3/1983 | Boylan et al. |
| 4,704,425 A | * | 11/1987 | Lagarde et al. ............. 524/492 |
| 4,849,022 A | | 7/1989 | Kobayashi et al. |
| 5,908,660 A | * | 6/1999 | Griffith et al. ............. 427/220 |
| 5,959,005 A | | 9/1999 | Hartmann et al. |
| 6,184,408 B1 | * | 2/2001 | Burns et al. ................ 556/450 |
| 6,191,122 B1 | * | 2/2001 | Lux et al. |
| 6,197,384 B1 | | 3/2001 | Schubert et al. |
| 6,736,891 B1 | * | 5/2004 | Bice et al. .................. 106/490 |

FOREIGN PATENT DOCUMENTS

| | | |
|---|---|---|
| DE | 2 242 728 | 3/1974 |
| DE | 24 35 860 | 2/1976 |
| DE | 25 13 608 | 10/1976 |
| DE | 26 28 975 | 12/1977 |
| DE | 27 29 244 | 1/1979 |
| DE | 28 29 906 | 3/1979 |
| DE | 34 11 759 | 3/1984 |
| EP | 0 340 129 | 11/1989 |
| EP | 0 367 934 | 5/1990 |
| EP | 0 798 348 | 10/1997 |
| GB | 813 453 | 5/1959 |
| WO | WO 95/05880 | 3/1995 |
| WO | WO 01/12731 | 2/2001 |

OTHER PUBLICATIONS

Chemical Abstracts, vol. 114, No. 14, XP–000121954, p. 58, Apr, 8, 1991.

* cited by examiner

Primary Examiner—Margaret G. Moore
(74) Attorney, Agent, or Firm—Oblon, Spivak, McClelland, Maier & Neustadt, P.C.

(57) ABSTRACT

The present invention provides a hydrophobic precipitated silica having the following properties:

| | |
|---|---|
| carbon content | 1.0–8.0% |
| methanol wettability | 20–55% |
| reflectance | >94% |
| BET/CTAB ratio | ≦1 |
| DBP absorption | <250 g/100 g |
| BET surface area | 50–110 m²/g |
| CTAB surface area | 100–150 m²/g |
| Sears number | <13. |

The present invention also provides methods for making and using the hydrophobic precipitated silica and articles and compositions which include the same.

26 Claims, 2 Drawing Sheets

Fig. 1

Fig. 2 ation is homogeneous.
HIGH-WHITENESS, NON-HEAT-TREATED HYDROPHOBIC PRECIPITATED SILICA

BACKGROUND OF THE INVENTION

1. Field of the Invention

The invention relates to a hydrophobic precipitated silica which is prepared without heat treatment, has a high level of whiteness and can be worked well in silicone rubber formulations and causes a high reinforcing action in the silicone vulcanizates.

2. Discussion of the Background

The treatment of finely divided solids, metal oxides, and silicates with organosilicon compounds, such as organopolysiloxanes, is described, for example, in DE 30 85 905. The heat treatment process is carried out under an inert atmosphere of nitrogen. Hydrophobic silicates are also described in, for example, DE 24 35 860, DE 22 42 728, and DE 25 13 608.

In the documents above, hydrophilic silicates and precipitated silicas are hydrophobicized by reacting them with organosilicon compounds. Examples of hydrophobicizers include organohalosilanes and organopolysiloxane compounds.

DE 26 28 975 and DE 27 29 244 describe preparing hydrophobic silicas by reacting a hydrophilic precipitated silica having low water absorbency with silicone oil or dimethyldichlorosilane, respectively. In the process according to DE 26 28 975, the reaction is carried out with the hydrophobicizer (silicone oil) being added to the dry precipitated silica; in the process according to DE 27 29 244, the hydrophobicizer (dimethyldichlorosilane) is introduced directly into the precipitated silica suspension. In both cases, the hydrophobicizing step is followed by heat treatment at elevated temperatures, specifically between 200 and 400° C.

A disadvantage of the above process is that the precipitated silica thus hydrophobicized becomes discolored at the required process temperatures. The discoloration of the hydrophobicized silica is particularly inconvenient when it is added to silicone formulations, i.e., when the hydrophobic precipitated silicas are added to silicone rubber formulations or to defoamer mixtures based on silicone oil.

A further disadvantage of the heat treatment at temperatures of 200–400° C. is its relatively high cost, which makes the hydrophobicized silica comparatively expensive.

It is possible to use reflectance as a measure of the discoloration. In a reflectance measurement, the diffuse reflection power of a sample is investigated. The higher the diffuse reflection power of a sample, the higher its reflectance and thus the higher the whiteness of the sample.

Precipitated silicas generally have a reflectance of not more than 97%. It would be desirable to hydrophobicize silicas in such a way that the reflectance of the original silica is retained.

SUMMARY OF THE INVENTION

One object of the present invention to provide a hydrophobic precipitated silica which has a high level of whiteness, can be worked well into silicone rubber formulations and exhibits good reinforcing properties in silicone rubber.

Another object of the invention is to hydrophobicize silicas and retain the reflectance of the original silicas.

It has surprisingly been found that a hydrophobic silica having the required properties is obtainable by applying a polysiloxane to a hydrophilic precipitated silica, followed by conditioning.

Accordingly, the objects above and others have been achieved by the present invention, the first embodiment of which provides a hydrophobic precipitated silica having the following properties:

| | |
|---|---|
| carbon content | 1.0–8.0% |
| methanol wettability | 20–55% |
| reflectance | >94% |
| BET/CTAB ratio | ≦1 |
| DBP absorption | <250 g/100 g |
| BET surface area | 50–110 m²/g |
| CTAB surface area | 100–150 m²/g |
| Sears number | <13. |

Another embodiment of the present invention provides a process for preparing hydrophobic precipitated silica, which includes:

a) preparing a mixture of an organopolysiloxane derivative and a precipitated silica, and b) conditioning the mixture for a period of 0.5 to 72 h at 10 to 150° C.

Another embodiment of the invention provides a hydrophobic precipitated silica, prepared by the above-mentioned process.

Another embodiment of the present invention provides a silicone rubber formulation, which includes silicone and the above-mentioned silica.

Another embodiment of the present invention provides a defoamer, which includes the above-mentioned silica.

Another embodiment of the present invention provides aA free-flow auxiliary, which includes the above-mentioned silica.

Another embodiment of the present invention provides a filled polymer, which includes the above-mentioned silica.

Another embodiment of the present invention provides an elastomer mixture, tire or sealant, which includes the above-mentioned silica.

Another embodiment of the present invention provides a carrier substance, which includes the above-mentioned silica.

Another embodiment of the present invention provides an emulsifying auxiliary, which includes the above-mentioned silica.

Another embodiment of the present invention provides an antiblocking auxiliary, which includes the above-mentioned silica.

Another embodiment of the present invention provides a pigment, which includes the above-mentioned silica.

Another embodiment of the present invention provides an insecticide, which includes the above-mentioned silica.

DESCRIPTION OF THE PREFERRED EMBODIMENTS

A more complete appreciation of the invention and many of the attendant advantages thereof will be readily obtained as the same becomes better understood by reference to the following detailed description when considered in connection with the accompanying drawings.

The ranges in the silica of the invention may be adjusted independently of one another.

The carbon content range of 1.0–8.0% by weight includes all values and subranges therebetween, including 1.1, 1.5, 1.7, 2, 2.1, 2.5, 3., 3.5, 4, 4.5, 5, 5.5, 6, 6.5, 6.7, 7, 7.1, 7.5 and 7.7%.

The methanol wettability range of 20–55% includes all values and subranges therebetween, including 21, 25, 27, 30, 35, 40, 41, 45, 47, 50 and 53%.

The reflectance range includes all values and subranges therebetween, including 94.1, 94.3, 95, 95.5, 96, 96.5, 97, 97.5, 98, 98.5, 99 and 100%.

The BET/CTAB ratio includes all values and subranges therebetween, including 0.99, 0.9, 0.7, 0.6, 0.5, 0.4, 0.3, 0.2 and 0.1.

The DBP absorption range includes all values and subranges therebetween, including 245 g, 235 g, 225 g, 220 g, 210 g, 200 g, 175 g, 150 g, 75 g and 50 g/100 g.

The BET surface area range includes all values and subranges therebetween, including 51, 55, 57, 60, 65, 70, 75, 80, 85, 90, 95, 100, 105, and 107 $m^2/g$.

The CTAB surface area range includes all values and subranges therebetween, including 101, 105, 110, 115, 120, 125, 130, 135, 140, 145, 147 and 149 $m^2/g$.

The Sears number range includes all values and subranges therebetween, including 12, 11, 10, 9, 8, 7, 6, 5, 4, 3, 2, and 1.

The silica of the invention has the advantage that standard commercial hydrophilic precipitated silicas can be hydrophobicized using inexpensive polysiloxane derivatives at temperatures <200° C. and can therefore be produced at a more favorable cost than the hydrophobic silicas produced by heat treatment. With the polysiloxane derivatives used, in the temperature range <200° C., no discoloration phenomena occur.

Preferably, the hydrophobic silicas of the invention may additionally, each independently of one another, have the following properties:

| | |
|---|---|
| pH | 5–9 |
| water content | <7% |
| conductivity | <200 μS |
| loss on ignition | 3–14% |

The conductivity may be below 150, 100, 60, or even 40 μS.

Another preferred embodiment of the present invention provides a process for preparing hydrophobic precipitated silicas, which includes the following steps:

a) preparing a mixture of an organopolysiloxane derivative and a precipitated silica, b) conditioning the mixture for a period of from 0.5 to 72 h at from 10 to 150° C.

Step b) takes place preferably by heat treatment at from 100 to 150° C. for from 0.5 to 2 hours or by storage at room temperature (10–30° C.) for a period of least 48 hours. These and the above-mentioned range in step (b) include all values and subranges therebetween, including, independently, 0.6, 0.8, 1, 2, 4, 6, 8, 10, 15, 20, 25, 30, 35, 40, 45, 50, 55, 60, 65 and 70 h, and 11, 13, 15, 17, 19, 20, 25, 30, 40, 60, 80, 110, 120, 130, 140 and 145° C.

Preferably, the hydrophobic precipitated silica of the invention features the following properties:

an extremely high whiteness (reflectance above 94%)

no discoloration phenomena are observable even at temperatures up to 200° C.

a highly homogeneous hydrophobicization, i.e., a steep methanol wettability curve methanol wettabilities of 20–55% easy working into silicone rubber formulations contains virtually no ionic impurities, i.e., low conductivity contains no surfactants, emulsifiers or organic solvents which might lead to discoloration at elevated temperatures stability to aqueous media (no elimination of hydrophobicizers).

The process for preparing the silica of the invention makes it possible to obtain homogeneous distribution of the hydrophobicizer while preferentially avoiding the use of solvents (except for water), emulsifiers, surfactants or other surface-active molecular moieties in the hydrophobicizer, so that the resulting silica combines low-thickening properties with the absence of discoloration.

The effective distribution of the hydrophobicizer and the homogeneous hydrophobicization of the precipitated silica of the invention results, with regard to silicone rubber formulations, in great ease with which the silica can be worked into the formulation, coupled with good mechanical and optical properties in the vulcanizates.

The silica of the invention is preferably treated with a polysiloxane containing predominantly methyl groups as organic radicals, this leading to a high thermal load-bearing capacity (temperatures up to 200° C. do not lead to any discoloration phenomena).

The water absorption of the hydrophobic precipitated silica of the invention, which is low for a precipitated silica, is made possible by the selection of a hydrophilic precipitated silica with a very low silanol group density and through very homogeneous hydrophobicization with organosilicon compounds. The measure used for the silanol group density is the Sears number, the measurement of which is defined in the examples.

The use of liquid polysiloxanes, preferably polymethylsiloxane of preferably 30–100 cSt, permits optimum distribution over the silica surface. This range includes all values and subranges therebetween, including 35, 40, 45, 50, 55, 60, 65, 70, 75, 80, 85, 90 and 95 cSt.

Polydimethylsiloxanes in the above viscosity range are, on the one hand, still mobile enough to distribute themselves well over the silica but on the other hand already large enough to bind thermally to the silica surface as a result of multiple hydrogen bonding between the silanol groups of the silica and the siloxane bridges of the siloxane molecules.

The plot of the methanol wettability, i.e., methanol concentration vs. sedimentation, is a measure of a homogeneous hydrophobicization.

Figure 1:
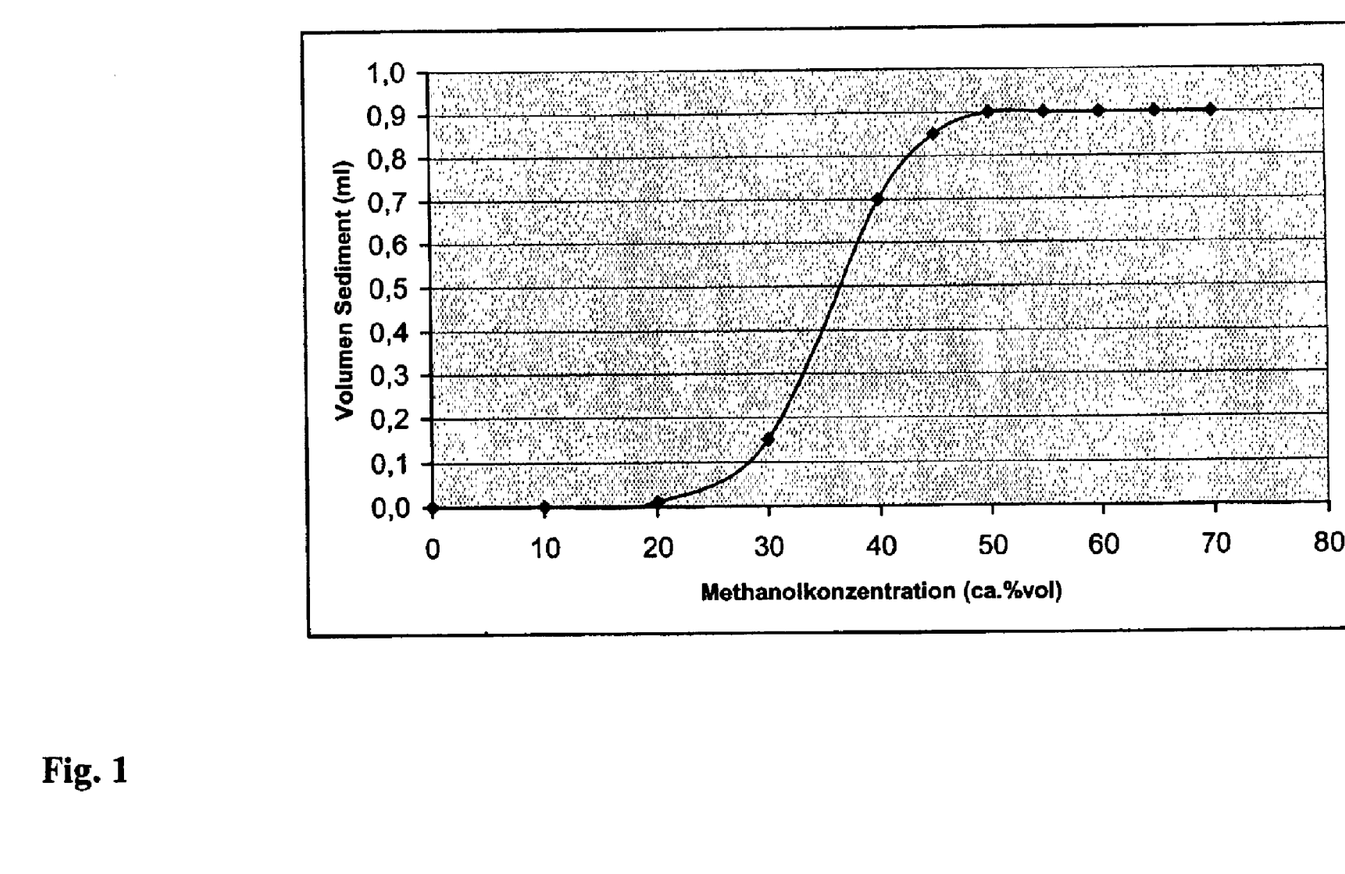
FIG. 1 shows that the conditioned silicas of the invention display a steep methanol wettability, i.e., hydrophobicization is homogeneous.
Figure 2:
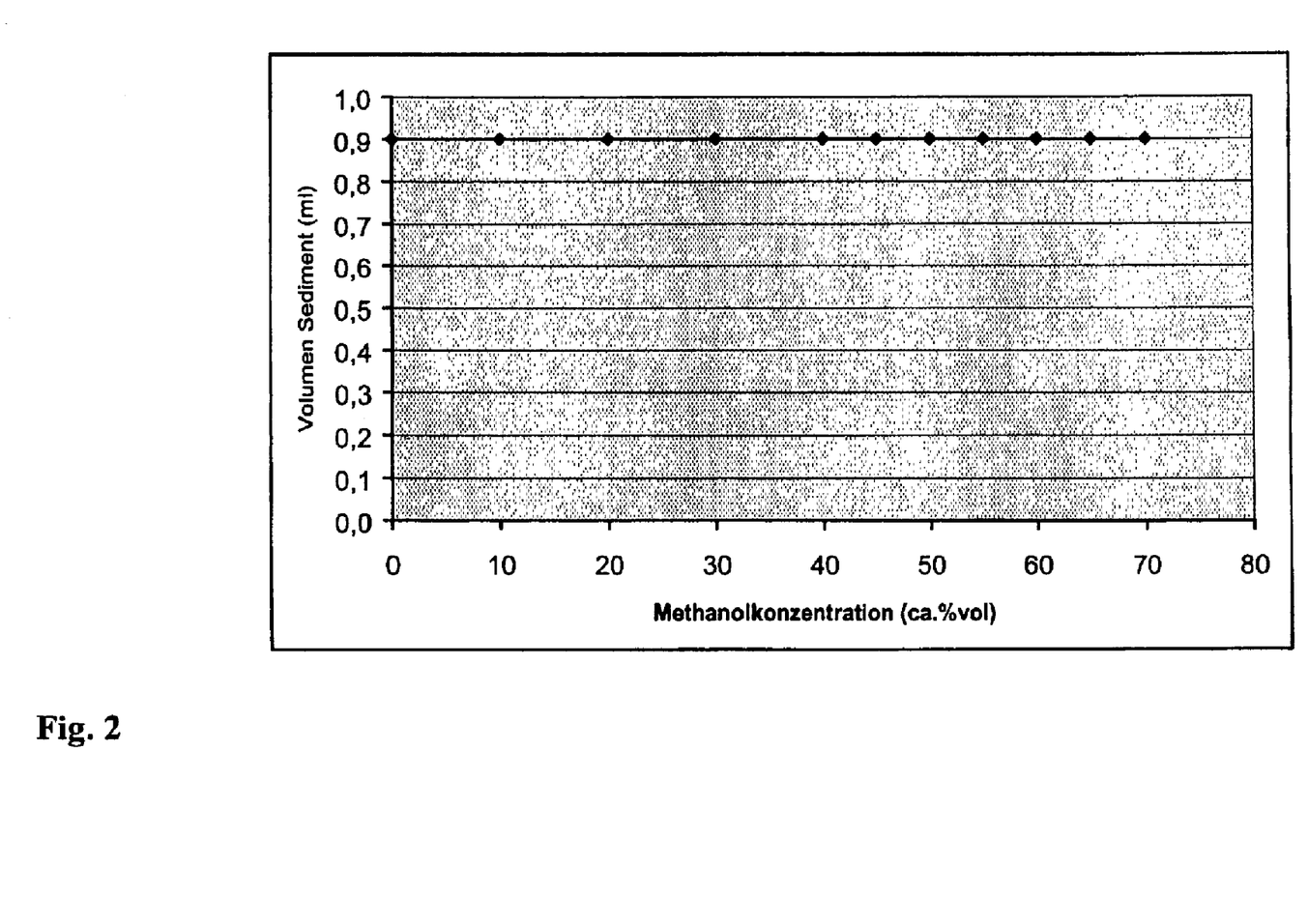
FIG. 2 shows the methanol wettability of customary hydrophobic silicas in which the organopolysiloxane has been distributed over the silica without conditioning.

Conditioned silicas of the invention display a steep methanol wettability, i.e., hydrophobicization in this case is homogeneous (FIG. 1). FIG. 2 shows the methanol wettability of customary hydrophobic silicas in which the organopolysiloxane derivative has been distributed over the silica without conditioning.

The hydrophobic precipitated silica of the invention is particularly suited for use in the following applications:

1. As a filler in silicone rubber formulations in LSR, HTV and RTV silicones.

2. As a defoamer component.

DE 28 29 906, U.S. Pat. No. 4,377,493, DE 34 11 759, U.S. Pat. No. 4,344,858, and WO 95/05880 disclose that hydrophobicized silicas can be used in defoamer formulations. Advantageous for high-level defoamer performance here are a certain hydrophobicity and a high surface area, readily accessible even to relatively large molecules, of the silica of the invention. The entire contents of each of the aforementioned references are incorporated by reference.

The high reflectances of the silicas of the invention ensure appealing defoamer formulations free from discoloration, particularly in formulations based on mineral oil and silicone oil.

3. As a free-flow agent.

Degussa AG brochure series, Fällungskieselsäuren und Silikate {Precipitated silicas and silicates}, 1984, discloses that hydrophobicized silicas can be used as free-flow auxiliaries. The entire contents of the aforementioned reference is hereby incorporated by reference. Because of its low water absorption, the silica of the invention is particularly suitable as a free-flow auxiliary for substances that are sensitive to hydrolysis. Here again, the high reflectances of the silicas of the invention are an additional advantage.

The silica of the invention may also be used as a carrier substance, particularly for insecticides, as an insecticide per se, as an antiblocking auxiliary, as a filler in tires or as an emulsification auxiliary.

Preferably, the hydrophobic precipitated silicas are prepared in two steps:

First of all, a liquid polysiloxane derivative is initially distributed, physically, on the silica surface. Where this initial distribution is carried out in aqueous media, i.e., suspensions or silica with a water content of more than 70%, then the silica is typically unstable. It must therefore be isolated quickly by filtration following the initial distribution, and/or subjected to short term drying (in a spin-flash drier or nozzle tower drier, for example). This conserves the distribution of the organopolysiloxane droplets on the silica and prevents separation into water, silicone oil, and silica.

Subsequently, in a controlled conditioning step—process step b)—the distribution of the hydrophobicizer is improved further and engagement of the polysiloxane derivative with the silica surface is achieved. This state of distribution is stable even in aqueous media. Following process step b), there is no longer any separation between the polysiloxane derivative and the silica. At carbon contents ≧3.1, the conditioned silicas can be adjusted steplessly to a methanol wettability of up to 55%. The BET/CTAB ratio after this step is <1. The binding of the polysiloxane to the silica is thought to be a result of the formation of multiple hydrogen bonds between the siloxane bridges of the polysiloxane molecules and the silanol groups on the silica surface.

As the organopolysiloxane derivative it is possible to use all organosilanes or organohalosilanes which are commonly used to hydrophobicize precipitated silicas.

Step a) of the process of the invention can be conducted with the following variants:

Addition of organopolysiloxane derivative to a precipitated silica having a water content of from 1 to 80% by weight, preferably from 20 to 60% by weight. These ranges include all values and subranges therebetween, including 2, 5, 10, 15, 25, 35, 45, 55, 65 and 75% by weight.

Addition of the organopolysiloxane derivative to a dispersion of the precipitated silica, i.e., following precipitation of silicate with an acid, for example, using a RHEIN-HÜTTE mixer or KOTTHOF-MISCHSIRENE or ULTRA-TURRAX. This necessitates rapid filtration and/or short term drying after the reaction.

Addition of the organopolysiloxane derivative to a precipitated silica having a water content of from 70 to 99% by weight, with subsequent isolation of the solid from the water. Isolation can be effected by filtration, spin-flash drying, or other accelerated drying (e.g., with the aid of a spray drier or nozzle tower drier). This range includes all values and subranges therebetween, including 71, 73, 75, 77, 79, 80, 82, 84, 86, 88, 90, 91, 93, 95 and 97% by weight. The higher the water content, the more quickly the isolation should be carried out. Separation is preferably avoided.

Simultaneous supplying of the precipitated silica or hydrous silica or the silica suspension and the organopolysiloxane derivative to a spin-flash drier.

Mixing of dry precipitated silica with polysiloxane, in a Gericke mixer, for example.

An alternative possibility is first to prepare a masterbatch, i.e., a conditioned precipitated silica, obtained according to process steps a) and b), and to mix it with a (hydrophilic), hydrous precipitated silica.

The water content of the hydrophilic precipitated silica may vary within the ranges mentioned above.

The base silica may be coated in a mass ratio, for example, of from 1:1 to 1:3 with silicone oil, e.g, DOW CORNING (R) 200 FLUID 50 CS (50 mPas dimethylpolysiloxane terminated with trimethylsilyl groups, carbon content of approximately 33%) (step a)). The resulting powder is conditioned at a temperature of more than 100° C. and for more than half an hour, for example. The conditioning (step b) here is carried out until the resulting material is wettable by water (methanol wettability <20; regarding the definition of methanol wettability see the measurement technique section) but which when introduced into water no longer exhibits any separation between silica and silicone oil (if step c) follows directly on from step b), a methanol wettability >20 is preferred). Mixing of this masterbatch, (e.g., 50% by weight silica and 50% silicone oil) with aqueous silica dispersions or silica suspensions produces stable mixtures in which the silicone oil no longer separates from the silica. The total mixture typically contains one part by weight of silicone oil, about 4–8 parts by weight of silica, and 20–60 parts by weight of water. In order to prepare such a suspension, for example, the masterbatch (e.g., 50% silica and 50% silicone oil) can be mixed thoroughly with about 10–16 times the amount of filtercake (solids content approximately 20%) and about 10–20 times the amount of additional water. The advantage of this procedure is that the water-wettable masterbatch (which contains up to 75% of hydrophobic organopolysiloxane) can be dispersed directly in silica precipitation suspensions or silica feeds, very finely and stably, without the need to use emulsifiers or surfactants. After such a mixture has been dried, or filtered and then dried, the organopolysiloxane-containing silica thus obtained can be conditioned again (step b).

These steps can be carried out individually, where appropriate with milling beforehand. Milling should not, however, be carried out before coating a). It is also possible to carry out two or more of these variants—that is, identical or different variants—in succession. The following embodiments of the process of the invention are possible:

One of steps a) or b) is performed a number of times (from 2 to 5 times) in succession.

Steps a) and b) are carried out a number of times (from 2 to 5 times) in succession; in other words, the process is run through a number of times.

Process step b) is preferably carried out by heat treatment at 100–150° C. over the course of from 0.5 to 2 hours. After conditioning, the partly hydrophobicized silica present may have a methanol wettability of 20% or more. Fundamentally, a distinction may be made between wet and dry hydrophobicization.

Wet hydrophobicization means that the silicate starting materials are aqueous silica suspensions, silica feeds, or high water content silica filtercakes, which are coated with the corresponding hydrophobicizers, as described, for example, in DE 27 29 244 (the entire contents of which are hereby incorporated by reference) for precipitation suspensions with organohalosilanes.

Dry hydrophobicization means that the silicate starting materials are silica powders with different moisture contents of from 1 to 75%, which are coated with the corresponding hydrophobicizers. This process is described, for example, in DE 26 28 975 (the entire contents of which are hereby incorporated by reference).

The silica of the invention is prepared using organopolysiloxane derivatives; it is, however, also possible to use other silicone compounds which react to give organopolysiloxanes under the chosen reaction conditions (for example, dichlorodimethylsilane in an aqueous environment).

Hydrophobicizing reagents preferably include organopolysiloxane derivatives or their precursors, for example, those with the following compositions:

$R_{4-n}SiX_n$ (where n=1, 2, 3);

$(SiR_xX_yO)_z$ (where $0 \leq x \leq 2$, $0 \leq y \leq 2$, $3 \leq z \leq 10$, with x+y=2);

$(SiR_xX_yN)_z$ (where $0 \leq x \leq 2$, $0 \leq y \leq 2$, $3 \leq z \leq 10$ with x+y=2);

$SiR_nX_mOSiR_oX_p$ (where $0 \leq n \leq 3$, $0 \leq m \leq 3$, $0 \leq o \leq 3$, $0 \leq p \leq 3$, where n+m=3, o+p32 3);

$SiR_nX_mNSiR_oX_p$ (where $0 \leq n \leq 3$, $0 \leq o \leq 3$, $0 \leq m \leq 3$, $0 \leq p \leq 3$, with n+m=3, o+p=3); and $SiR_nX_m(SiR_xX_yO)_zSiR_oX_p$ (where $0 \leq n \leq 3$, $0 \leq m \leq 3$, $0 \leq x \leq 2$, $0 \leq y \leq 2$, $0 \leq o \leq 3$, $0 \leq p \leq 3$, $1 \leq z \leq 10000$ with n+m=3, x+y=2, o+p=3).

The above compounds may be linear, cyclic, and branched silane, silazane and siloxane compounds. R may include alkyl and/or aryl radicals, which may be substituted by one or more functional groups such as the hydroxyl group, the amino group, polyethers such as ethylene oxide and/or propylene oxide, and halide groups such as fluoride. R may also contain groups such as hydroxyl, amino, halide, alkoxy, alkenyl, alkynyl, and allyl groups, and groups containing sulfur. X may include reactive groups such as silanol, amino, mercapto, halide, alkoxy, alkenyl, and hydride groups. Each of the alkyl, aryl, alkoxy, alkenyl, alkynyl, and allyl groups may independently have any number of carbons as appropriate for the group, including those having 1, 2, 3, 4, 5, 6, 7, 8, 9, 10, 11, 12, 13, 14, 15, 16, 17, 18, 19, 20, 21, 22, 23, 24, 25, 26, 27, 28, 29 and 30 carbons as appropriate.

Preference is given to linear polysiloxanes having the composition:

$SiR_nX_m(SiR_xX_yO)_zSiR_oX_p$ (where $0 \leq n \leq 3$, $0 \leq m \leq 3$, $0 \leq x \leq 2$, $0 \leq y \leq 2$, $0o \leq 3, 0 \leq p \leq 3$, $1 \leq z \leq 10000$ with n+m=3, x+y=2, o+p=3) in which R is preferably represented by methyl.

Particular preference is given to polysiloxanes having the composition:

$SiR_nX_m(SiR_xX_yO)_zSiR_oX_p$ (where $0 \leq n \leq 3$, $0 \leq m \leq 1$, $0 \leq x \leq 2$, $0 \leq y \leq 0.2$, $0 \leq o \leq 3$, $0 \leq p \leq 3$, $1 \leq z \leq 1000$ with n+m=3, x+y=2, o+p=3) in which R is preferably represented by methyl. Owing to the chosen process of the invention, however, it is preferable to use polysiloxanes of low volatility which contain no functional groups.

Because of the presence of certain functional groups in polysiloxane, salts or low molecular mass substances such as $NH_3$, amines, alcohols, etc. may be formed, which can lead to disruptive impurities. An important exception here is constituted by silanol-functionalized polysiloxanes, since the only impurity formed here is water, which is easy to remove under the chosen process conditions.

With preference, the hydrophobicizer may comprise a methyl-terminated polydimethylsiloxane, in particular one having a viscosity of 30–100 mPas, preferably 40–60 mPas. These ranges include all values and subranges therebetween, including 31, 33, 35, 37, 39, 45, 50, 70, 80, 90, 91, 93, 95, 97 and 99 mPas. An example of a suitable polysiloxane oil is DOW CORNING (R) 200 FLUID 50 CS.

Since the aforementioned hydrophobicizers are compounds of low volatility, an important part in the initial distribution of the hydrophobicizers on the silica surface is played by capillary forces and diffusion events at the liquid/solid phase boundary.

Even if the hydrophobicizers used with preference exhibit a certain volatility in the course of a thermal treatment, the liquid/solid distribution is still important. For this reason, a distinction is made here between physical, initial distribution, conditioning, and heat treatment.

Following the conditioning step, the hydrophobicized silica is optionally milled. Milling before the coating step a) is not preferred, and leads to inhomogeneous coating and hydrophobicization. Milling is preferably carried out to give a product having an average particle size $d_{4,3}$ of 2–30 μm, with particular preference 8–15 μm. These ranges include all values and subranges therebetween, including 3, 4, 5, 6, 7, 9, 10, 11, 13, 17, 19, 21, 23, 25, 27, and 29 μm.

The precipitated silicas of the invention are particularly suitable as a filler in silicone rubber formulations, elastomer mixtures, polymers, tires or sealants, as defoamers, carriers, emulsifying or antiblocking auxiliaries, as pigments, as free-flow auxiliaries or insecticides.

In order to develop fully their mechanical properties, silicone rubber formulations require active reinforcing fillers. It is common to use highly dispersed silicas. The reinforcing filler must bring about good mechanical properties in the vulcanizate and must be able to be easily worked into the silicone rubber formulation.

HTV and LSR formulations are processed at temperatures well above 100° C. At such temperatures, hydrous fillers may lead to disruptive formation of vapor bubbles in the silicone formulation.

A low moisture absorption, as in the silica of the invention, is therefore an advantage in terms of the processability of the silica in these silicone rubber formulations.

This property is derived from the nature of the base silica used and from the nature of the hydrophobicization. The base silica is preferably a precipitated silica which has a very low silanol group density (the measure used for the silanol group density is the ratio Sears number to BET surface area). The low silanol group density of the base silica is also manifested in a low loss on ignition of 3.0±0.5—at a BET surface area of 150–170 $m^2/g$.

For silicone rubber mixtures which are processed at temperatures of almost 200° C. with ingress of air, it is preferred that there are no organic constituents on the silica which might undergo discoloration under the influence of oxygen at these temperatures. Organosilicon compounds containing exclusively methyl, phenyl, fluorocarbon or hydrofluorocarbons as organic radicals are extremely temperature-stable even in the presence of atmospheric oxygen. The process of the invention makes it possible to suppress this discoloration. These discoloration phenomena are measured by reflectance measurements with an optical measurement technique based on diffuse reflection. Where the reflectances of silica are >94%, the silica-filled silicone rubber compound appears pure white. Since the refractive indices of silica and silicone rubber are close to one another, even very small impurities and discolorations in the silica filler become clearly visible in the silicone rubber. A reflectance of 93% already leads to a marked discoloration in the silicone rubber, visible with the naked eye, despite the fact that the silica powder before incorporation appears pure white to the viewer.

The hydrophobic precipitated silicas according to the invention are employed preferably in amounts of from 5 to 50% by weight in silicone rubber formulations, more preferably from 10% to 40% by weight, based on the overall weight of the compositions which can be cured to give elastomers. In the case of HTV organopolysiloxane elastomers it is possible to use up to 50% by weight. Each of the above ranges independently includes all values and subranges therebetween as appropriate, including 6, 7, 8, 9, 10, 15, 20, 25, 30, 35, 40, 45, 47 and 49%.

Besides diorganopolysiloxanes, the hydrophobicized precipitated silica of the invention, crosslinking agents and crosslinking catalysts, the compositions which can be cured to elastomers may of course where appropriate include fillers which are conventionally, often or usually, used in compositions that can be cured to elastomers. Examples of such substances are fillers having a surface area of less than 50 $m^2/g$, such as quartz flour, diatomaceous earth, and also zirconium silicate and calcium carbonate, and also untreated fumed silica, organic resins, such as polyvinyl chloride powders, organopolysiloxane resins, fibrous fillers, such as asbestos, glass fibers and organic pigments, soluble dyes, fragrances, corrosion inhibitors, agents which stabilize the compositions against the influence of water, as well as acetic anhydride, agents which retard curing, such as benzotriazole, and plasticizers, such as trimethylsiloxy-endblocked dimethylpolysiloxanes.

The cited combination of physicochemical characteristics of the hydrophobic precipitated silica of the invention results in an outstanding reinforcing filler. The equilibrium moisture content, much lower than that of the known precipitated silicas, brings advantages in processing, in the context, for example, of vulcanization at atmospheric pressure, which produces pore-free vulcanizates in comparison with the use of the known, hydrated precipitated silicas. The optimized pH and the low DBP number lead to perceptibly reduced roller-softening times. The low electrolyte content in combination with the low moisture content leads ultimately to good electrical properties in the vulcanizates.

As the silicate starting material, it is preferred to use precipitated silicas which possess a very low silanol group density, i.e., a low alkali consumption/BET surface area ratio, a relatively high CTAB surface area for approximately the same BET surface area, and a high level of whiteness and purity.

Preferably, the base silica is prepared as follows. Aqueous sodium silicate solution (waterglass) and sulphuric acid is added with stirring into a reaction vessel pre-charged with water. During the addition, an alkaline pH is maintained. The silica precipitates from the reaction mixture, which is then acidified to pH 2–5 and filtered. The solid product is washed neutral with water and dried.

Any silica with the following properties is particularly preferred as the starting base silica material for the hydrophobic process according the invention:

| | |
|---|---|
| BET surface area ($m^2/g$) | 50–170 |
| CTAB surface area ($m^2/g$) | 50–170 |
| Loss on ignition based on the substance dried 2 h/105° C. (DIN 55921) (%) | ≦3.5% |
| pH 5% (methanol/aqueous solution) (DIN 53200) | 5–9 |
| Conductivity (in 5% aqueous dispersion) ($\mu S$) | <500 $\mu S$ |
| Tapped density | >200 g/l |
| Sears Number | <13. |

The base silica and the polysiloxane are mixed until a defined carbon content is obtained. In other words, the mixing ratio is a function of the arithmetic proportion for setting the required carbon content. The entire contents of DIN 55921 and DIN 53200 are hereby incorporated by reference.

EXAMPLES

Having generally described this invention, a further understanding can be obtained by reference to certain specific examples which are provided herein for purposes of illustration only and are not intended to be limiting unless otherwise specified.

1. Measurement Techniques 1.1 Methanol Wettability

Silicas whose surfaces have been modified with nonhydrolyzable organic groups are usually not wetted by water.

These hydrophobic silicas can, however, be wetted by a methanol/water mixture. The fraction of methanol in this mixture—expressed as a percentage by weight—is a measure of the hydrophobicity of modified silica. The higher the methanol fraction, the better the hydrophobicization of the substance.

Procedure:

200 mg of each hydrophobic silica or silicate sample is weighed out into 6 centrifuge tubes each with a capacity of 15 ml, and each of the tubes is filled with 8 ml of a methanol/water mixture of ascending methanol concentration. The methanol concentration of the mixtures is guided by the anticipated methanol wettability. The centrifuge tubes are tightly sealed and then shaken vigorously (10 up-and-down motions). To separate the wetted silica/silicate fractions, the tubes are then centrifuged at 2500 rpm for 5 minutes. The wetted fractions form a sediment whose volume can be read off on the scale on the centrifuge tubes. On a graph, the sediment volumes are plotted against the methanol/water mixture concentration. These individual points produce a curve whose position and steepness characterizes the degree of hydrophobicization of the sample under analysis.

Apparatus:

Precision balance

Centrifuge

Centrifuge tubes, graduated

Dispensettes 1.2 DBP Absorption

The DBP absorption (DBP number), which is a measure of the absorbency of the precipitated silica, is determined as follows:

The dibutyl phthalate number is determined using the Brabender plastograph. The DBP number is a measure of the absorbency of a pulverulent product for liquid. The absorbency is dependent on the moisture content, the particle size, and the amount of material analyzed.

Apparatus And Reagents

Brabender plastograph with plotter

Multi-Dosimat E 415 (50l) from Metrohm

Dibutyl phthalate

Procedure 12.5 g of silica are introduced into the kneader of the Brabender plastograph. With continued mixing (kneader paddle speed 125 rpm), dibutyl phthalate runs into the mixture at a rate of 4 ml/minute. The force required for incorporation is low. Toward the end of the determination, the mixture becomes poorly free-flowing. This fact is documented in an increase in the required force, which is indicated on the scale. When the scale has moved by 300, DBP metering is automatically shut off.

Evaluation

The density of DBP is 1.047 g/ml. The DBP absorption is based on the anhydrous, dried substance. When using precipitated silicas of relatively high moisture content, the value must be corrected using the following table if these silicas are not dried prior to the determination of the DBP number.

Correction Table For Dibutyl Phthalate
Absorption—Anhydrous—

| % water | % water | | | | |
|---|---|---|---|---|---|
| % water | .0 | .2 | .4 | .6 | .8 |
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

The correction figure corresponding to the water content is added to the experimentally determined DBP value; for example, a water content of 5.8% would mean an add-on of 33 g/100 g for the DBP absorption.

1.3 Particle Size

The particle size is determined using a Malvern Mastersizer in ethanol following ultrasound treatment for 5 minutes. The measurement is made automatically and provides the average particle size $d_{4.3}$ from a volume distribution.

1.4 Determination of the Tristimulus Value $R_y$ In Accordance with DIN 5033 Application Using the Datacolor 3890 spectrophotometer, the tristimulus value $R_y$ is determined for silicas, silicates, and zeolites (powder suspensions). The entire contents of DIN 5033 are hereby incorporated by reference.

Analytical Procedure:

Before measurement, the samples are milled to an average particle diameter of 8–15 µm and then pressed to a tablet using a powder press. The amount required depends on the fineness of the powder. The amount of powder introduced is such that the thread of the press closure reaches its last turn.

The samples are placed under the meter, and whiteness measurement $R_y$ and $R_{460}$ are selected from the menu of the control computer. After the sample designation has been entered, the space key is operated in order to start the measurement.

Following entry of the memory code, the measurements are printed out.

The values are calculated automatically in accordance with the following formula:

$$y = \sum_{400}^{700} S*(\lambda)*Y(\lambda)*R(\lambda)$$

where $Y(\lambda)$ is the standard distribution coefficient, $S(\lambda)$ is the relative spectral radiation distribution of the illumination source, and $R(\lambda)$ is the spectral reflectance of the sample.

1.5 Determination of the Sears Number of Silicas, Silicates and Hydrophobic Silicas 1. Application:

Free OH groups are detectable by titration with 0.1 N KOH in the range from pH 6 to pH 9.

2. Apparatus 2.1 Precision balance accurate to 0.01 g 2.2 Memotitrator DL 70, Mettler, equipped with 10 ml and 20 ml Bürette, 1 pH electrode and 1 pump (e.g., NOUVAG pump, type SP 40/6)

2.3 Printer 2.4 Titration vessel 250 ml, Mettler 2.5 Ultra-Turrax 8000–24000 rpm 2.6 Thermostated waterbath 2.7 2 dispensers 10–100 ml for metering methanol and deionized water 2.8 1 dispenser 10–50 ml for metering deionized water 2.9 1 measuring cylinder 100 ml 2.10 IKA universal mill M 20

3. Reagents 3.1 Methanol p.A.

3.2 Sodium chloride solution (250 g NaCl p.A. in 1000 ml deionized water)

3.3 0.1 N hydrochloric acid 3.4 0.1 N potassium hydroxide solution 3.5 Deionized water 3.6 Buffer solutions pH 7 and pH 9

4. Procedure 4.1 Sample preparation

Mill about 10 g of sample for 60 seconds in the IKA universal mill M 20.

Important: Since only very finely ground samples give reproducible results, these conditions must be strictly observed.

4.2 Analytical procedure 4.2.1 Weigh out 2.50 g of the sample prepared in accordance with section 4.1 into a 250 ml titration vessel.

4.2.2 Add 60 ml of methanol p.A.

4.2.3 After complete wetting of the sample, add 40 ml of deionized water 4.2.4 Disperse for 30 seconds using the ULTRA-TURRAX at a speed of about 18000 rpm 4.2.5 Rinse particles of sample adhering to the vessel edge and stirrer into the suspension using 100 ml of deionized water 4.2.6 Condition sample to 25° C. in a thermostated waterbath (for at least 20 minutes)

4.2.7 Calibrate pH electrode with the buffer solutions pH 7 and pH 9

4.2.8 The sample is titrated in the Memotitrator DL 70 in accordance with method S 911. If the course of titration is indistinct, a duplicate determination is carried out subsequently.

The results printed out are as follows:

pH $V_1$ in ml/5 g $V_2$ in ml/5 g

5. Calculation:

$$V_1 = \frac{V*5}{E}$$

$$V_2 = \frac{V*5}{E}$$

$V_1$=ml KOH or ml HCl to pH6/5 g of substance $V_2$=ml KOH consumed to pH9/5 g of substance E=initial mass Principle:

First of all the initial pH of the suspension is measured, then according to the result the pH is adjusted to 6 using KOH or HCl. Then 20 ml of NaCl solution are metered in.

The titration is then continued to a pH of 9 using 0.1 N KOH.
Sears Numbers
Si—OH+NaCl→Si—ONa+HCl
HCl+KOH→KCl+H$_2$O 1.6 Determination of the Tamped Density in Accordance with DIN/ISO 787/11

The entire contents of DIN/ISO 787/11 are hereby incorporated by reference.

Procedure:

10 g of the sample under analysis are weighed accurately to 0.01 g on the precision balance, and are introduced into the graduated 250 ml glass cylinder of the jolting volumeter. After 1250 jolts, the volume of the tapped material is read off.

Calculation:

Tapped density:

$$g/l = \frac{E \cdot 1000}{I}$$

E=initial mass in g
I=volume in ml
Apparatus:
Precision balance
Jolting volumeter
  Engelsmann, Ludwigshafen
250 ml glass cylinder,
graduated
  Engelsmann, Ludwigshafen
Remarks:

In special cases, the material may be passed through a 500 μm sieve before weighing, or the initial mass may be increased. This must be specified in a test report.

1.7 Determination of CTAB Surface Area

1. Application

The method is based on the adsorption of CTAB (N-cetyl-N,N,N-trimethylammonium bromide) on the "external" surface, which is also referred to as the "rubber-active surface".

The adsorption of CTAB takes place in aqueous solution at pH=9 with stirring and ultrasound treatment. Excess, unadsorbed CTAB is determined by back-titration with SDSS (dioctylsodium sulfosuccinate solution) using a titroprocessor, the endpoint being given by the maximum clouding of the solution and determined using a phototrode.

For the calculation, an occupancy of 0.35 nm$^2$ per CTAB molecule is assumed.

The determination is made in accordance with ASTM 3765, the entire contents of which are hereby incorporated by reference.

With each measurement series, a standard sample of type VN 3 silica should be tested as well.

2. Reaction Equation; (back-titration)

$$R_1\text{—}SO_3^- + {}^+N(CH_3)_3R_2 \longrightarrow R_1SO_3N(CH_3)_3R_2$$

NDSS      CTAB

3. Apparatus:
   3.1 Mill, e.g. IKA, type: M 20
   3.2 Analytical balance
   3.3 Magnetic stirrer
   3.4 Magnetic stirrer rod
   3.5 Titroprocessor, e.g., METTLER, type DL 55 or DL 70, equipped with:
     pH electrode, e.g., Mettler, type DG 111
     phototrode, e.g. Mettler, type DP 550, and
     burette, 20 ml volume, for SDSS solution,
     burette, 10 ml volume, for 0.1 N KOH
   3.6 titration beakers, 100 ml, made of polypropylene
   3.7 glass titration vessel, 150 ml volume, closable with snap-on lid
   3.8 conical flasks, 100 ml volume, closable with screw lid or NS stopper
   3.9 ultrasound bath
   3.10 pressure filtration device
   3.11 membrane filter of cellulose nitrate, pore sizes of 0.1 μm, 47 mm ø, e.g., Sartorius type 113 58
   3.12 pipettes, 5 ml, 100 ml
4. Reagents:
   4.1 Potassium hydroxide solution, 0.1 N
   4.2 CTAB solution, 0.0151 mol/l
   5.50 g of CTAB are dissolved with stirring (magnetic stirrer) in about 800 ml of warm (about 30–40° C.) demineralized water in a glass beaker, transferred to a 1 l graduated flask, made up to the mark with demineralized water after cooling to 23–25° C., and transferred to a stock bottle.

Note:

The solution must be stored and the measurement conducted at ≧23° C., since CTAB crystallizes out below this temperature. The solution should be prepared 10–14 days prior to use.

4.3 SDSS solution 0.00426 mol/l 1.895 g of SDSS (dioctylsodium sulfosuccinate) in a glass beaker are admixed with about 800 ml of demineralized water and the mixture is stirred with a magnetic stirrer until all of the material has dissolved. The solution is then transferred to a 1 l graduated flask, made up to the mark with demineralized water, and transferred to a stock bottle.

SDSS solution readily undergoes biodegradation. The solution prepared should therefore be sealed well and should not be stored for more than 3 months.

The concentration of the CTAB solution is assumed to be exact: 0.0151 mol/l.

The concentration of the SDSS solution should be determined daily by means of a "blank" titration.

5. Procedure:
   5.1 Blank titration (to determine the concentration of the SDSS solution)
   5.2 The consumption of SDSS solution for 5 ml of CTAB solution should be checked (blank value) 1× per day before each series of measurements
   5.1.2 Pipette precisely 5 ml of CTAB solution into titration beakers
   5.1.3 Add about 50 ml of demineralized water
   5.1.4 Titrate with the titroprocessor until the end of titration Each blank titration should be performed as a duplicate determination; in the case where values do not agree, further titration should be carried out until the results are reproducible.

5.2 Adsorption
   5.2.1 The granulated and coarse samples are ground in a mill (the beater blade of the mill must be covered)
   5.2.2 Weight out exactly 500 mg of the ground sample on the analytical balance to a precision of 0.1 mg
   5.2.3 Transfer the sample amount weighed out quantitatively to a 150 ml titration vessel with magnetic stirrer rod 5.2.4 Add exactly 100 ml of CTAB solution, seal titration vessel with lid, and stir on a magnetic stirrer for 15 minutes 5.2.5 Screw the titration vessel onto the titroprocessor and adjust the pH of the suspension to 9.0±0.05 using KOH, 0.1 mol/l 5.2.6 4-minute treatment of the suspension in the ultrasound bath 5.2.7 Filtration through a pressure filter fitted with a membrane filter.

During adsorption, it must be ensured that the temperature is held within the range from 23° C. to 25° C.

5.3 Titration 5.3.1 Pipette 5 ml of filtrate (see section 5.2.7) into 100 ml titration beakers and make up to about 50 ml with demineralized water 5.3.2 Screw titration beakers onto the titrator 5.3.3 Carry out titration with SDSS solution in accordance with the defined measurement method, until clouding reaches a maximum.

Each titration should be performed as a duplicate determination; in the case where values do not agree, further titration should be carried out until the results are reproducible.

6. Calculation $$m^2/g = (V_1 - V_2) * \frac{100 * E * 2 * 578.435}{V * 1000}$$

$$m^2/g = (V_1 + V_2) * \frac{115.687 * E}{V_1}$$

$$m^2/g = (V_1 + V_2) * \frac{115.687}{V^1} * 5.5$$

$V_1$=blank sample (ml of SDSS when using 5 ml of CTAB)
$V_2$=consumption (ml of SDSS when using 5 ml of filtrate)
E=initial mass g CTAB/l (5.5 g)
578.435=occupancy of 1 g of CTAB in $m^2$.

The measurement is normally to be given corrected to the anhydrous substance:

Where the measured value for the standard sample differs by more than ±3 $m^2/g$ from the theoretical value, the entire measurement series must be repeated.

7. Notes
 re 1. In $$m^2/g = \frac{CTAB \ m^2/g * 100}{100 - \% \ H_2O}$$

the
literature, SDSS (dioctylsodium sulfosuccinate) is also called Aerosol OT.

On samples with a pH>9, such as Extrusil, the pH is measured but not corrected, since the acid may alter the surface.

Prior to beginning the titration, the phototrode is set to 1000 mV, corresponding to a transparency of 100%.

re 3. For measuring the different prescribed volumes of the CTAB solution, it is also possible to use dispensers or piston-stroke pipettes, provided they are regularly calibrated.

re 4. The solutions indicated in sections 4.1 and 4.3 can also be purchased as ready-to-use solutions. The present supplier is Kraft, Duisburg.

Order No. 6056.4 CTAb solution 0.0151 ml/l
Order No. 6057.4 SDSS solution 0.00423 mol/l (in 2.5-liter glass bottles)

re 5.2.4 Hydrophobic samples which are not wetted after stirring are to be dispersed carefully using an ULTRA-TURRAX before the pH is adjusted, in order to wet them.

re 5.2.5 For adjusting the pH it is advisable to use a titrator. The titration is carried out in accordance with the endpoint method.

re 5.2.7 For filtration, nitrogen from a gas bottle is to be used; an admission pressure of 4–6 bar is to be set.

re 6. Should it be necessary to repeat a measurement series, it should be noted in particular that the pH meter used to set the pH must also be recalibrated.

1.8 Determination of Water Vapor Absorption (Water Vapor Isotherms)

To determine the water vapor absorption, the sample is exposed to different relative humidities at constant temperature (30° C.). The establishment of a constant weight is awaited.

To start with, completely dry air (i.e., air humidity approximately zero) is used. After the equilibrium weight has been reached, this weight is chosen as the reference point; in other words, the water vapor absorption at a higher air humidity is expressed as the difference between the sample weight in completely dry air (following establishment of equilibrium) and the sample weight in humid air (following establishment of equilibrium). The air humidity is varied in steps of 10%.

In order to rule out hysteresis effects, both the water adsorption and the water vapor desorption are measured.

Preparation of Base Silica Used in the Examples 50.0 $m^3$ of water are charged to a reaction vessel. Slowly, 9.2 $m^3$ of waterglass solution and 0.9 $m^3$ of $H_2SO_4$ are added with stirring to the initial charge, an alkaline pH being maintained in the mixture during the addition. After the end of the addition of waterglass and $H_2SO_4$, the pH of the resulting suspension is within the alkaline range. The suspension is acidified and filtered, and the solid product is washed with deionized water. The hydrophilic base silica can be dried, preferably by an accelerated drying method. The following data relate to the dried precipitated silica (base silica) thus obtained.

| | |
|---|---|
| BET surface area ($m^2/g$) | 150–170 |
| CTAB surface area ($m^2/g$) | 150–170 |
| Loss on ignition based on the substance dried 2 h/105° C. (DIN 55921) (%) | 3 ± 0.5 |
| pH 5% (methanol/aqueous solution) (DIN 53200) | 6–7 |
| Conductivity (in 5% aqueous dispersion) | <150 $\mu S$ |
| Tapped density | >250 g/L. |

EXAMPLE 1

Drying and coating of the base silica with silicone oil (e.g., DOW CORNING (R) 200 FLUID 50 CS, carbon content about 33%, viscosity of 50 mPas) is carried out by means of a spin-flash dryer. The silica is then conditioned (aged at room temperature for at least 48 hours) until it has a methanol wettability of at least 20%. The analytical data of the conditioned silica are given in table 1.1.

TABLE 1.1

Analytical data of the conditioned silica

| | | |
|---|---|---|
| Water | % | 5.2 |
| pH | | 6.1 |
| Conductivity | μS | 41 |
| N₂ surface area | m²/g | 84 |
| CTAB surface area | m²/g | 132 |
| Tapped density | g/L | 317 |
| Alpine SR > 180 μm | % | 63 |
| Reflectance | % | 95.9 |
| C content | % | 4.12 |
| Methanol wettability | % | >20 |

EXAMPLE 2

The base silica is coated with silicone oil dimethylpolysiloxane, 50 mPas, e.g. DOW CORNING (R) 200 FLUID 50 CS, carbon content approximately 33%) in a Gericke mixer in a mass ratio of 1:1. The resulting powder is conditioned for an hour at a temperature of 105° C. This produces a material in which, although it is wettable by water, the silica and silicone oil can no longer be separated from one another in water. Mixing of this masterbatch with filtercakes of the base silica produces stable formulations in which the silicone oil no longer separates from the hydrophilic filtercake. A hydrophobic masterbatch and a hydrophilic filtercake thus prepared are conveyed together into the spin-flash drier, in which they are mixed and dried. The dimethylsiloxane-treated silica is conditioned by aging at room temperature for at least 48 hours (about 3 days) until it has attained a methanol wettability of at least 20%. The analytical data of the conditioned silica are given in table 2.1.

TABLE 2.1

Analytical data of the conditioned silica

| | | |
|---|---|---|
| Water | % | 3.4 |
| pH | | 6.3 |
| Conductivity | μS | 100 |
| N₂ surface area | m²/g | 74 |
| CTAB surface area | m²/g | 119 |
| DBP absorption | g/100 g | 198 |
| Tapped density | g/L | 323 |
| Reflectance | % | 95.9 |
| C content | % | 5.03 |
| Methanol wettability | % | >20 |

EXAMPLE 3

The initial distribution of silicone oil (viscosity of 50 mPas, methyl-terminated, e.g., DOW CORNING (R) 200 FLUID 50 CS, carbon content approximately 33%) on the silica (in the form of filtercakes) takes place in a spin-flash drier, with simultaneous drying. The dimethylsiloxane-treated silica is conditioned by aging at room temperature for 48 hours (about 3 days) until it has attained a methanol wettability of at least 20%. The analytical data of the conditioned silica are given in table 3.1.

TABLE 3.1

Analytical data of the conditioned silica

| | | |
|---|---|---|
| Water | % | 5.2 |
| PH | | 6.1 |
| Conductivity | μS | 41 |
| N₂ surface area | m²/g | 84 |

TABLE 3.1-continued

Analytical data of the conditioned silica

| | | |
|---|---|---|
| CTAB surface area | m²/g | 132 |
| Tapped density | g/L | 317 |
| Reflectance | % | 95.9 |
| C content | % | 4.12 |
| Methanol wettabilit | % | >20 |

EXAMPLE 4

The base silica is coated in a Gericke mixer in a mass ratio of 1:1 with silicone oil (dimethylpolysiloxane, 50 mPas, terminated with trimethylsilyl groups, e.g DOW CORNING (R) 200 FLUID 50 CS, carbon content approximately 33%). The resulting powder is conditioned for an hour at a temperature of 105° C. This produces a material in which, although it is wettable by water, the silica and silicone oil can no longer be separated from one another with water. Mixing of this masterbatch (i.e., 50% silica and 50% silicone oil) with aqueous silica dispersions produces stable suspensions in which the silicone oil can no longer be separated from the silica. The overall mixture typically contains 1 part by weight of silicone oil, about 4–8 parts by weight of silica, and 20–60 parts by weight of water. To prepare such a suspension, the masterbatch (i.e., 50% silica and 50% silicone oil) is mixed thoroughly with about 14–16 times the amount of filtercake (solids content approximately 20%) and about 11–13 times the amount of additional water. The analytical data of the dispersion are given in table 4.1, those of the correspondingly conditioned silica in table 4.2.

TABLE 4.1

Suspension data

| | | |
|---|---|---|
| Solids content | % | 12.8 |
| PH | | 5.2 |
| Conductivity | μS | 382 |
| Viscosity | mPas | 183 |

The suspension is dried using a spray drier. The dimethylsiloxane-treated silica is conditioned by aging at room temperature for 48 hours (about 3 days) until it has attained a methanol wettability of at least 20%. The analytical data of the conditioned silica are given in table 4.2.

TABLE 4.2

Analytical data of the conditioned silica

| | | |
|---|---|---|
| Loss on ignition | % | 12.4 |
| Water | % | 2.2 |
| pH | | 6.4 |
| Conductivity | μS | 135 |
| N₂ surface area | m²/g | 80 |
| CTAB surface area | m²/g | 131 |
| DBP absorption | g/100 g | 236 |
| Tapped density | g/L | 256 |
| Reflectance | % | 94.5 |
| C content | % | 4.21 |
| Methanol wettability | % | >20% |

EXAMPLE 5

Silicone oil, (methyl-terminated polydimethylsiloxane, 50 mPas, e.g., DOW CORNING (R) 200 FLUID 50 CS, carbon content approximately 33%) is suspended in a suspension of the base silica (solids content 12.8%) using a high-shear mixer. The distribution of the silicone oil in the silica suspension is conserved by immediate spray drying. The dimethylsiloxane-treated silica is conditioned by aging at room temperature for 48 hours (about 3 days) until it has attained a methanol wettability of at least 20%. The analytical data of the conditioned silica are given in table 5.1.

TABLE 5.1

Analytical data of the conditioned silica

| Loss on ignition | % | 13.0 |
| --- | --- | --- |
| Water | % | 2.2 |
| pH | | 5.5 |
| Conductivity | µS | 100 |
| $N_2$ surface area | $m^2/g$ | 85 |
| CTAB surface area | $m^2/g$ | 137 |
| DBP absorption | g/100 g | 253 |
| Tapped density | g/L | 270 |
| Reflectance | % | 94.2 |
| C content | % | 4.78 |
| Methanol wettability | % | >20% |

Obviously, numerous modifications and variations of the present invention are possible in light of the above teachings. It is therefore to be understood that within the scope of the appended claims, the invention may be practiced otherwise than as specifically described herein.

This application is based on German patent application 10138492.0, filed Aug. 4, 2001, the entire contents of which are hereby incorporated by reference.

What is claimed is:

1. A hydrophobic precipitated silica having the following properties:

| carbon content | 1.0–8.0% |
| --- | --- |
| methanol wettability | 20–55% |
| reflectance | >94% |
| BET/CTAB ratio | ≦1 |
| DBP absorption | <250 g/100 g |
| BET surface area | 50–110 $m^2/g$ |
| CTAB surface area | 100–150 $m^2/g$ |
| Sears number | <13. |

2. The silica as claimed in claim 1, having an average particle size of 2–30 µm.

3. The silica as claimed in claim 1, having a pH of 5–9.

4. The silica as claimed in claim 1, having a water content of <7%.

5. The silica as claimed in claim 1, having a conductivity of <200 µS.

6. The silica as claimed in claim 1, having a loss on ignition of 3 to 14%.

7. The silica as claimed in claim 1, having a carbon content of 2–6% by weight.

8. A process for preparing hydrophobic precipitated silica as claimed in claim 1, which comprises:

a) preparing a mixture of an organopolysiloxane derivative and a precipitated silica, and b) conditioning the mixture for a period of 0.5 to 72 h at 10 to 150 C.

9. The process as claimed in claim 8, wherein step a) comprises adding the organopolysiloxane derivative to a precipitated silica having a water content of from 1 to 80%.

10. The process as claimed in claim 8, wherein step a) comprises adding the organopolysiloxane derivative to a precipitated silica having a water content of from 70 to 99%, to produce a solid, and subsequently isolating the solid from the water.

11. The process as claimed in claim 8, wherein step a) comprises simultaneously supplying a precipitated silica or hydrous precipitated silica and an organopolysiloxane derivative to a spin-flash drier.

12. The process as claimed in claim 8, wherein step a) comprises mixing a precipitated silica with a hydrophobic precipitated silica obtained according to steps a) and b).

13. The process as claimed in claim 8, wherein one of the steps a) and b) is carried out more than once in succession.

14. The process as claimed in claim 8, wherein both steps a) and b) are carried out more than once in succession.

15. The process as claimed in claim 8, wherein step b) comprises heat treatment at 100 to 150 C for 0.5 to 2 hours.

16. The process as claimed in claim 8, wherein step b) comprises storage at room temperature for at least 48 hours.

17. A silicone rubber formulation, comprising silicone and the silica as claimed in claim 1.

18. A defoamer, comprising the silica as claimed in claim 1.

19. A free-flow auxiliary, comprising the silica as claimed in claim 1.

20. A filled polymer, comprising the silica as claimed in claim 1.

21. An elastomer mixture, tire or sealant, comprising the silica as claimed in claim 1.

22. A carrier substance, comprising the silica as claimed in claim 1.

23. An emulsifying auxiliary, comprising the silica as claimed in claim 1.

24. An antiblocking auxiliary, comprising the silica as claimed in claim 1.

25. A pigment, comprising the silica as claimed in claim 1.

26. An insecticide, comprising the silica as claimed in claim 1.

* * * * *

UNITED STATES PATENT AND TRADEMARK OFFICE
CERTIFICATE OF CORRECTION

PATENT NO. : 6,899,951 B2
DATED : May 31, 2005
INVENTOR(S) : Christian Panz et al.

It is certified that error appears in the above-identified patent and that said Letters Patent is hereby corrected as shown below:

Delete Drawing Sheets 1-2 and substitute the drawing sheets consisting of FIGS 1-2 as shown on the attached pages.

Column 1,
Line 57, "invention to" should read -- invention is to --.

Column 2,
Line 31, "provides aA" should read -- provides a --.

Column 7,
Line 23, "o+p 32 3" should read -- o+p=3 --;
Line 47, "0o≤3" should read -- 0≤o≤3 --.

Column 12,
Line 61, "pH6/5 g" should read -- pH6/(5g) --;
Line 62, "pH9/5 g" should read -- pH9/(5g) --.

Signed and Sealed this

Twenty-first Day of March, 2006

JON W. DUDAS
*Director of the United States Patent and Trademark Office*

Fig. 1

Fig. 2